United States Patent
Brzeski

(10) Patent No.: US 12,420,464 B2
(45) Date of Patent: Sep. 23, 2025

(54) METHOD FOR PRODUCING FIBER-REINFORCED PLASTIC PARTS, AND FIXING BY MEANS OF A DOUBLE-SIDED ADHESIVE LAYER

(71) Applicant: Markus Brzeski, Weilerbach (DE)

(72) Inventor: Markus Brzeski, Weilerbach (DE)

( * ) Notice: Subject to any disclaimer, the term of this patent is extended or adjusted under 35 U.S.C. 154(b) by 188 days.

(21) Appl. No.: 17/799,403

(22) PCT Filed: Feb. 8, 2021

(86) PCT No.: PCT/DE2021/100118
§ 371 (c)(1),
(2) Date: Aug. 12, 2022

(87) PCT Pub. No.: WO2021/160215
PCT Pub. Date: Aug. 19, 2021

(65) Prior Publication Data
US 2023/0061235 A1 Mar. 2, 2023

(30) Foreign Application Priority Data
Feb. 13, 2020 (DE) .................. 20 2020 100 778.5

(51) Int. Cl.
*B29C 45/14* (2006.01)
*B29C 70/20* (2006.01)
(Continued)

(52) U.S. Cl.
CPC ........ *B29C 45/14065* (2013.01); *B29C 70/20* (2013.01); *B29C 70/543* (2013.01);
(Continued)

(58) Field of Classification Search
CPC . B29C 70/543; B29C 45/14065; B29C 70/20; B29C 2045/14114; B29C 70/86
See application file for complete search history.

(56) References Cited

U.S. PATENT DOCUMENTS 6,482,287 B1 * 11/2002 De Gaulle .............. B29C 45/14
156/506
9,145,097 B2 * 9/2015 Beau ..................... B32B 21/04
(Continued)

FOREIGN PATENT DOCUMENTS

DE         100 12 378 C2     11/2001
DE    10 2008 031 814 B3      1/2010
(Continued)

OTHER PUBLICATIONS

Ludwig, English Translation of DE102008031814B3 (Year: 2010).*
(Continued)

*Primary Examiner* — Michael A Tolin
*Assistant Examiner* — Hana C Page
(74) *Attorney, Agent, or Firm* — Collard & Roe, P.C.

(57) ABSTRACT

In a method for producing fiber-reinforced plastic parts in a mold and an adhesive layer for carrying out the method, the adhesive layer adhesive force on the mold is greater than the adhesive layer adhesive force on the segment, so that, after a first segment is removed, the adhesive layer remains completely in the mold and after the temperature of the adhesive layer is increased through contact with a melted plastic matrix, the remaining adhesive force is sufficient to adhere at least a second segment. The adhesive layer, introduced into the mold relatively expensively, and removed from the mold and disposed of at further expense, is used repeatedly, not just for a single adhesion operation. The expense for procuring the adhesive layer, its introduction into the mold, removal and disposal remains but through its division over numerous production operations, the total expenditure proportion for each operation decreases dramatically.

6 Claims, 1 Drawing Sheet

Figure 2:
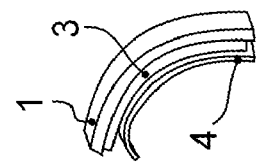

(51) Int. Cl.
  *B29C 70/54* (2006.01)
  *B29C 70/86* (2006.01)
  *B29L 31/00* (2006.01)

(52) U.S. Cl.
  CPC .... *B29C 70/86* (2013.01); *B29C 2045/14114* (2013.01); *B29L 2031/757* (2013.01)

(56) References Cited

U.S. PATENT DOCUMENTS

| | | | |
|---|---|---|---|
| 9,833,954 B2 * | 12/2017 | Kybelund | B29C 70/30 |
| 10,287,461 B2 | 5/2019 | Jakobeit et al. | |
| 10,843,389 B2 * | 11/2020 | Weis | B29C 45/14786 |
| 11,260,567 B2 * | 3/2022 | Fuchs | B32B 27/322 |
| 2003/0124952 A1 * | 7/2003 | Marine | B29C 39/10 |
| | | | 446/385 |
| 2010/0089527 A1 | 4/2010 | Lee et al. | |
| 2015/0293558 A1 | 10/2015 | Hahn et al. | |
| 2016/0167267 A1 | 6/2016 | Laight | |
| 2017/0320275 A1 | 11/2017 | De Waal Malefijt et al. | |
| 2019/0316006 A1 | 10/2019 | Brzeski | |

FOREIGN PATENT DOCUMENTS

| | | | | |
|---|---|---|---|---|
| DE | 10 2015 208 320 A1 | 11/2016 | | |
| EP | 2626185 A1 * | 8/2013 | ....... | B29C 45/14065 |
| EP | 2 803 475 A1 | 11/2014 | | |
| EP | 3 078 475 A1 | 10/2016 | | |
| EP | 3 553 144 A1 | 10/2019 | | |
| JP | H04-216023 A | 8/1992 | | |

OTHER PUBLICATIONS

Ludwig (English Translation of DE102008031814) (Year: 2008).*
"Tape 101" (Can-Do Tape, Available Nov. 3, 2010). (Year: 2010).*
English Translation of DE102019201025 (Year: 2019).*
International Search Report in PCT/DE2021/100118, dated May 14, 2021.

* cited by examiner

METHOD FOR PRODUCING FIBER-REINFORCED PLASTIC PARTS, AND FIXING BY MEANS OF A DOUBLE-SIDED ADHESIVE LAYER

CROSS REFERENCE TO RELATED APPLICATIONS

This application is the National Stage of PCT/DE2021/100118 filed on Feb. 8, 2021, which claims priority under 35 U.S.C. § 119 of German Application No. 20 2020 100 778.5 filed on Feb. 13, 2020, the disclosure of which is incorporated by reference. The international application under PCT article 21 (2) was not published in English.

The invention relates to a method for producing fiber-reinforced plastic parts in a mold. It further relates to an adhesive layer for carrying out the method.

In the prior art, very many molded parts are produced from liquefied plastic in a mold, for example using the injection molding, impact extrusion or thermoforming method. To cool the plastic as evenly as possible, without tension and with predictable shrinkage, the wall thickness is to be constructively designed as uniformly as possible, preferably over the entire area of the plastic part. In order to improve the dimensional stability of the end product and to reduce the production costs, the molding-in of tear-resistant fibers is to be preferred over wall thickenings, which are disadvantageous from a molding-technology point of view as reinforcement for static regions of the molded part or regions particularly stressed by the function.

The handling of the fibers is simplified in that they are bundled in a separate machine as a preliminary product, and are formed into a flexible strip by being molded around with plastic. This fiber-reinforced plastic strip is then fixed segment-by-segment at the correct place in the mold. When liquid plastic is pressed into the mold, the strip is covered with the liquid plastic on all of its surfaces that face into the mold, whereby it is also molded into the resulting molded part and is integrated with a smooth surface into the wall thereof.

From EP 3 078 475 A1, a method is known for the production, by means of injection molding, of a molded body reinforced with at least one reinforcement element, wherein the reinforcement element is integrally bonded with the injection molding tool, so that, during subsequent injection molding, the reinforcement element is fixed in the tool. The method comprises the following steps:

- impregnating an endless flat roving with a melt of a first thermoplastic polymer to form a fiber ribbon,
- applying, in regions, at least one adhesive means on the fiber ribbon, with subsequently melting the at least one adhesive means,
- cooling and curing the fiber ribbon,
- heating the injection molding tool to a temperature that is not lower than 20 K below the melting point of the adhesive means,
- introducing the at least one fiber ribbon into the injection molding tool, wherein at least some of the regions of the fiber ribbon coated with the adhesive means are brought into contact with at least one temperature-controlled injection molding tool wall,
- injection molding a second thermoplastic polymer into the tool,
- removing the molded body, reinforced with at least one fiber ribbon, from the injection mold.

To fix the segments of the strip within an injection mold, DE 100 12 378 C2 describes that a plastic strip, reinforced with carbon fibers, is unwound at a desired length from a roll and the thus-freed first end is positioned by a robot arm at the desired position within the injection mold, is pressed onto the injection mold by a pressure roller, and is then cut. An electric high-voltage generator is connected to the second end of the molded-in and electrically conductive carbon fiber. The other pole of the high-voltage generator is connected to the electrically conductive injection mold. The high electric voltage difference in the kilovolt range between the injection mold and the carbon-fiber-reinforced plastic strip electrostatically charges the plastic of the strip, whereby the strip adheres to the surface of the injection mold.

The disadvantage of this procedure is that electrically conductive fibers or an electrically conductive polymer are required for the strip. Electrically non-conductive fibers or plastics cannot be used.

A further disadvantage is the elaborate electrical insulation of essential assemblies of the robot compared to its other components. Disadvantageous is also the required electrical insulation of the surface of the injection mold, to which end this expensive component must be coated at considerable expense. For small series and individual pieces, in particular, the method according to DE 100 12 378 C2 can only be used at unreasonably high expense.

As an alternative to the aforementioned electrostatic fixing of the segments, Karl Steiner describes, in his dissertation, 1995, Kaiserslautern University. VDI Fortschritt-Berichte (VDI progress reports), Series 2/No. 369, Düsseldorf: VDI-Verlag, 1995, entitled "Einsatz einer robotergesteuerten Anlage zum Bandablegen von thermoplastischen Verbundwerkstoffen" [Application of a robot-controlled system for strip depositing of thermoplastic composite materials], the affixing of the segments of fiber-reinforced plastic strips in injection molds. To do this, he used so-called "double-sided adhesive strips" to which he let the segments adhere.

As a disadvantage, DE 100 12 378 C2 states, in 2000, that the application of adhesives and adhesive strips could contaminate the surface of the injection molded part. These material deposits adversely affect e.g. a subsequent painting of the surface.

For applying an adhesive layer without disruptive impurities, the double-sided adhesive strips, which consist of an adhesive layer on a carrier foil, are known in the current prior art. They are unwound—usually from a spool—and then applied at the desired place, by means of pressure onto the carrier foil. In a second work step, the carrier foil is subsequently pulled off the adhesive layer.

The main disadvantage of this procedure is the considerable expense in terms of working time and equipment involved in the introduction of the adhesive layer and the carrier foil, in the removal of the carrier foil prior to injection molding, and in the removal of the adhesive layer after molding.

Also disadvantageous are the material expense for the carrier foil and the adhesive layer, as well as the time and costs required for disposing of these auxiliary materials.

DE 10 2008 031 814 B3 describes a method for producing at least one component, in which it is provided for that an adhesive means is arranged on an inner wall of a tool half of a molding tool, that a foil is fixed over this adhesive means on the inner wall, and that the fixed foil is back-injected on a side facing away from the inner wall, and thus the at least one component is produced, wherein the at least one component produced in this manner is removed from the inner wall while releasing the foil from the adhesive means.

The fixing of a flexible insert fabric by means of a double-sided adhesive layer is known from JP H04 216023 A.

In view of this background, the invention addresses the object of limiting the aforementioned disadvantages and developing, for plastic parts that are produced in a mold, more particularly using the injection molding, impact extrusion or thermoforming method, and are to be partially reinforced in their mechanical load capacity by means of molded-in fibers, a simple, universally applicable method that saves working time and material costs, said method being suitable for both new and existing systems, and in which segments of fiber-reinforced plastic strips, as a semi-finished product, adhere flatly to the inner wall of the mold in the correct position, wherein this adhesion is so resilient that it does not change, or only changes slightly, during the molding process, and the plastic strip connects to the liquid plastic in an adhesive manner.

According to the invention, this object is solved in that the adhesive layer is spaced apart from the edge of the segment on all sides, and the adhesive force of the adhesive layer on the mold is greater than the adhesive force of the adhesive layer on the segment, so that, after a first segment has been lifted off, the adhesive layer remains completely in the mold and, after the temperature of the adhesive layer has been increased through the contact with a melted plastic matrix, the remaining adhesive force of the adhesive layer is sufficient for the adhesion of at least a second segment.

The core idea of the invention is therefore that the adhesive layer, which is introduced into the mold at relatively great expense, and which must then also be removed from the mold and disposed of at further expense, is used not just for a single adhesion operation, but repeatedly.

Here, repeatedly is understood to be 3 times, 5 times, 10 times, 50 times, 100 times, preferably several hundred times, in particular 150 times, 200 times, 300 times or 400 times the number of uses. The expense for the procurement of the adhesive layer, its introduction into the mold, the removal and the disposal still does not change as a result of the principle according to the invention. However, through its division over numerous production operations, the proportion of the total expenditure for each individual production operation decreases dramatically.

For the inventive principle of fixing the segments in the mold through gluing, it is not relevant how the adhesive layer is applied to the surface of the mold. If the adhesive does not connect at all to the introduced plastic, but rather only to the plastic of the segments of the flexible strip made of fiber-plastic composite material, it can also be applied, e.g. by means of injection or spraying, outside of the regions of the mold to be covered by the segments. In this case, the adhesive does not chemically contaminate the workpiece. If the adhesive layer is only a few micrometers thick, the geometry of the surface of the workpiece is also negligibly influenced in practice. However, if the injected plastic chemically reacts with the layer of adhesive, the adhesive and the plastic must remain separate from one another.

If the adhesive layer is spaced apart from the edge of the segment, the front of the surge of liquid plastic that flows into the mold will no longer lift up the edge region of the segment lying directly on the mold. Consequently, the liquid plastic does not push itself between the segment and the mold, and therefore also does not come into contact with the adhesive layer.

The advantages of the method according to the invention include that—in contrast to the electrostatic fixing of the segments—the limit values of 25 µm for the surface roughness and 1 mm per 10 cm for the ripple, which should not be exceeded during electrostatic adhesion, can be exceeded during fixing by means of an adhesive layer.

If the adhesive layer covers the same area as the segment, the segment separates the adhesive layer from the plastic introduced into the mold. The marginally tiny contact at the side walls of the adhesive layer will be negligible in many practical applications.

A further development of the invention is that, prior to introduction into the mold, the associated adhesive layer is located on a carrier foil, wherein the adhesive power of the adhesive layer on this carrier foil is so low that the carrier foil can be used as a mechanical carrier for the adhesive layer during introduction, but is then pulled off the adhesive layer, the adhesive layer hereby remaining at least for the most part in the mold.

For these cases, a carrier foil can be supplied with the adhesive layer in exactly the same mold as the segment and pressed onto exactly the place in the mold to which the segments are thereafter to be glued. If the adhesive force of the adhesive layer is lower on the carrier foil than on the mold, the carrier foil can be removed and disposed of, or reused, after it has been inserted and pressed on. Only the layer of adhesive then remains on the surface of the mold. It must be noted that the later insertion of the segments must be relatively very accurate, so that no part of the layer of adhesive reacts with the injected plastic.

Alternatively, it is possible that the associated adhesive layer is already located on the segment prior to introduction into the mold.

In this alternative embodiment, a segment is provided with an adhesive layer even prior to insertion.

In a further embodiment, this adhesive layer can be covered with a protective foil as transport protection, which protective foil must be removed prior to being stuck on. When the coated segment is then inserted into the mold and pressed onto the same, the adhesive layer and the segment are located at exactly the same place in the mold.

When this first segment is molded into liquid plastic and removed from the mold with the finished molded part, it is claimed according to the invention that the adhesive layer remains in the mold. When a next, and a one-after-the-next, and many further segments are consecutively glued on this adhesive layer, they must be positioned very accurately if the adhesive layer is always to be completely covered by the segment.

The required positioning accuracy can be reduced in that the adhesive layer covers only part of the area of the segment. Attention must be paid that the respective adhesive force then still suffices.

Normally, the adhesive force of the adhesive layer lessens with each further use. If the segments can no longer be held and/or are displaced during injection, the old adhesive layer must either be coated with a fresh second adhesive layer, provided that the resulting double layer meets the requirements, or the aged adhesive layer must be removed. The adhesive can be detached from the mold by using a chemical treatment, burning off, pulling off, scraping off, melting and wiping or suctioning away, or a tape, to which the adhesive adheres better than to the mold.

Alternatively, a cleaning compound (e.g. plastic) can be injected into the mold. To this end, after the last segment has been lifted off, the adhesive layer must build up an adhesive force to the cleaning compound that is higher than the adhesive force between the adhesive layer and the mold. Then, the cleaning compound, together with the adhesive, is removed as a whole from the mold.

According to the invention, there is also an adhesive layer for carrying out the method according to the invention, wherein the adhesive layer consists of two adhesive layers having differing adhesive forces, wherein the adhesive layer facing the segment has a lower adhesive force than the adhesive layer facing the mold and a separating foil is arranged between the two adhesive layers, said separating foil enabling the separation of the two adhesive layers.

One significant advantage of the inventive principle is that of using fiber-reinforced plastic strips, produced in enormous lengths, as standard, as semi-finished products, to reinforce the injection-molded parts. If these strips are relatively narrow, complexly-shaped reinforcements can also be achieved by assembling together multiple smaller segments.

Preferably, segments with a thickness of up to 5 mm are incorporated perpendicular to the mold. The strip segments can be distorted and/or curved to the extent that the size of the remaining contact surfaces still ensures a sufficient adhesive force to the mold. An improved integration into the plastic part is supported by a chamfer on the boundary of 10 to 70°, or a radius on the edge.

The merit of this invention is that of defining the long-known principle of gluing such that, even when the adhesive layer is used repeatedly, the adhesion of the strip segments to the injection-molding tool is sufficiently great such that said strip segments do not slip at all, or at most slip by a defined deviation, during the injection-molding process, and are exactly positioned in the end product and here are also optimally connected to the injection-molded product. This connection is characterized in that the surface of the end product is so smooth that no edge to the segment can be felt and there is no distortion. The strip segments can hardly be detached from the end product.

Figure 1:
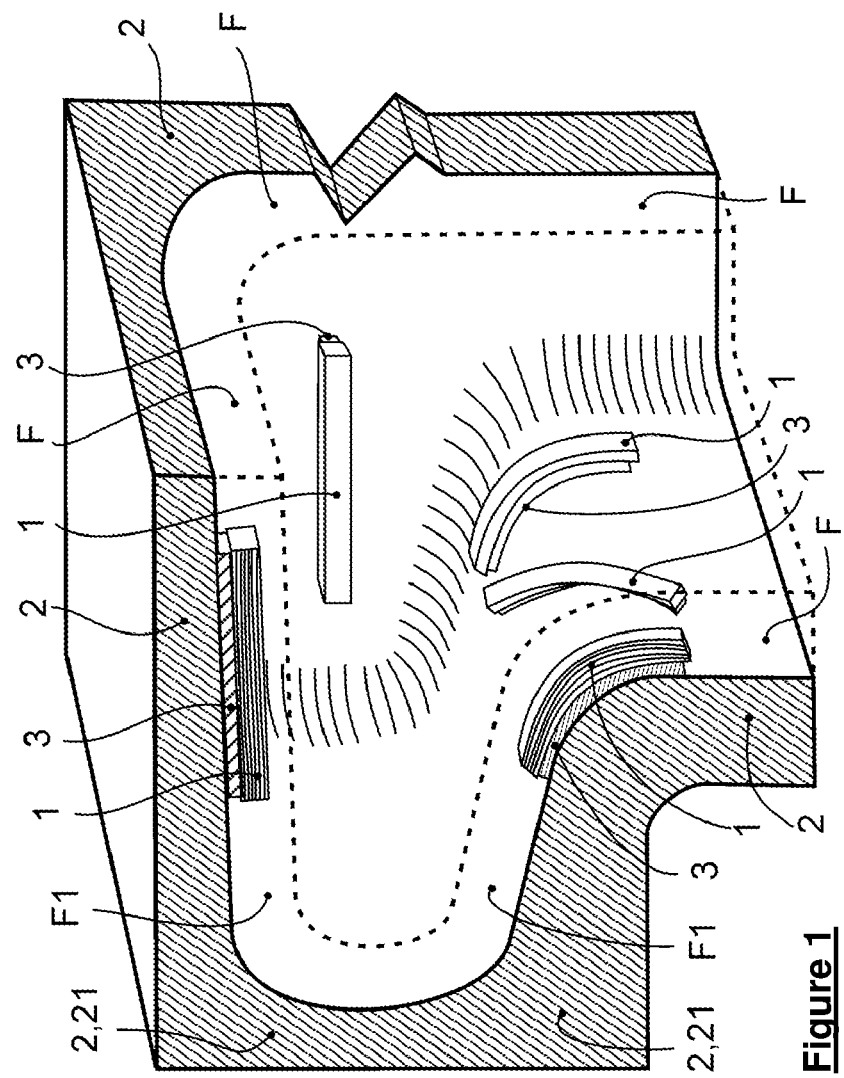

Further details and features of the invention are explained in more detail below on the basis of an exemplary embodiment. This intends merely to explain, not to restrict, the invention. The following is shown in schematic representation:

FIG. 1 a section of an injection mold with segments, glued therein, of a flexible strip made of fiber-plastic composite material FIG. 2 a curved segment with adhesive layer and protective foil FIG. 1 shows, as a perspective view, the corner part of an injection mold 2 that serves to produce a molded part F, shown by a dotted line. At the shown corner, said molded part F is provided with a short support column F1, extending horizontally and to the left, which support column is molded in the recess 21 of the injection mold 2. From the recess 21, the concave transition to the rear wall of the injection mold 2 is shown by hatching in FIG. 1.

If forces that are oriented transverse to the longitudinal axis act on the end of the support column F1 shown far left, the support column F1 is particularly stressed at its transition points to the remaining region of the molded part F. In this exemplary embodiment, to avoid tearing of the plastic material in this critical connection zone of the support column F1 to the rest of the molded part F, five segments 1 of a flexible strip made of fiber-plastic composite material are also molded-in.

Of these, the two segments 1 that can be seen on the left are drawn in section, so that the fibers extending therein more or less in the longitudinal direction of the segment 1 become visible. The respective adhesive layers 3, which fix the two segments 1 on the inner surface of the injection mold 2, are also drawn in section.

In FIG. 1, it is easy to comprehend that, before the molded part F is molded, the segments 1 must be fixed with sufficient adhesive force on the inner surface of the injection mold 2. The adhesive force must not only be sufficient to ensure that the segments 1 remain in the required position with the required accuracy, but also that they adhere to the surface of the injection mold 2 over as large an area as possible, in particular in the curved regions, so that they withstand the surge from the wave of the injected liquid plastic for the molded part F.

To this end, adhesive layers 3 ensure the adhesion of the segments 1 to the injection mold 2. They are shown in FIG. 1 with a very great material thickness, so that they can be recognized. In practice, however, they will merely be a film that is so thin that it is hardly identifiable as a separate layer, and thus also does not leave behind any notch in the surface of the molded part F. Both adhesive layers 3 consist of permanently sticky hot-melt adhesives with differing adhesive forces, wherein the adhesive layer facing the segment 1 has a lower adhesive force than the adhesive layer facing the injection mold 2. The former is, for example, an adhesive layer on the basis of thermoplastic rubber, the latter is an adhesive made of synthetic rubber. The configuration of the material of the adhesive layers required for this is carried out, according to the current prior art, on the basis of catalogs and technical data from the adhesive manufacturers, depending on the materials of the injection mold, the plastic of the fiber-reinforced segment as well as under consideration of the selected maximum temperature for the processing operation.

In FIG. 1, it is clear to see that the segments 1 can be fixed on flat parts of the injection mold 2 just as well as on curved parts. In particular, the flexible segments 1 can also be arranged in a twisted manner. Through the application of multiple adjacent segments 1, larger reinforcements of the molded part F can be formed.

FIG. 2 shows a segment 1 that is already curved to the extent required for application onto a convex curvature of the injection mold 2. On its side facing the injection mold 2, said segment is provided with an adhesive layer 3. Said adhesive layer is covered with a protective foil 4 to prevent it from being touched prior to the adhesion, and thus becoming unusable. FIG. 2 shows the state shortly before introduction of the segment 1 into the injection mold 2, wherein the protective foil 4 has started to be pulled off.

For practical trials, a matrix of polypropylene with a material thickness of 0.2 mm was introduced into an injection mold made of tool steel with a synthetic rubber coating of the surface as an adhesive layer. A segment of a plastic strip made of PP, which was reinforced with numerous fibers made of carbon, was fixed in the injection mold on the adhesive layer and injected into the surface of a molded part made of fiberglass-reinforced polypropylene. Before the first injection operation, the adhesive force between the adhesive layer and the surface of the injection mold was 1.4 times greater than the adhesive force between the adhesive layer and the segment. After the first injection molding at a temperature of 235 degrees and the removal of the finished molded part together with the segment molded thereon, the adhesive layer remained completely in the injection mold. The adhesive force between the adhesive layer and the injection mold subsequently fell, but was still 1.2 times greater than the adhesive force between the adhesive layer and the next segment glued into the injection mold.

With every further injection molding and every further new segment of the strip made of fiber-plastic composite material glued into the injection mold, the absolute values for the adhesive forces fell by 2 percent, but the respective adhesive force between the injection mold and the adhesive layer was still greater than the adhesive force between the adhesive layer and the segment. Herein, the latter adhesive force was sufficient not just to hold each new segment in the mold prior to injection molding for a total of 75 injection operations, but also to prevent the respective segment from slipping during injection molding. For the 24 next injection molding operations, the stuck-on segment was in each case displaced only by up to 1 mm, i.e. around 8 percent of the width of the strip.

After up to 400 injection molding operations, the adhesive force of the adhesive layer was no longer sufficient to glue a further segment into the mold and hold it there in a defined manner during the injection molding. The adhesive layer then had to be removed from the mold.

LIST OF REFERENCE SIGNS

F Molded part is reinforced by the molding-in of segments 1 in the injection mold 2
F1 Support column on molded part F
1 Segment of a flexible strip of fiber-plastic composite material
2 Injection mold for molded part F
21 Recess in the injection mold 2 for shaping the support column F1
3 Adhesive layer between injection mold 2 and segment 1
4 Protective foil 4 on adhesive layer 3

The invention claimed is:

1. A method for producing fiber-reinforced plastic parts in a mold, the method comprising:
fixing a first segment of a first flexible strip made of fiber-plastic composite material to a surface of the mold using an adhesive layer between the first segment and the mold, wherein the adhesive layer is spaced apart from all peripheral edges of the first segment and the adhesive force of the adhesive layer on the mold is greater than the adhesive force of the adhesive layer on the first segment,
lifting the first segment off the mold, the adhesive layer remaining completely in the mold after the first segment has been lifted off,
heating the adhesive layer by contact of the first segment with a melted plastic matrix,
and after the heating of the adhesive layer, adhering at least a second segment of a second flexible strip made of fiber-plastic composite material to the surface of the mold using the remaining adhesive force of the adhesive layer.

2. The method according to claim 1, further comprising:
locating the adhesive layer on a carrier foil and introducing the adhesive layer on the carrier foil into the mold, wherein the adhesive layer on the carrier foil has an adhesive power low enough for the carrier foil to act as a mechanical carrier for the adhesive layer during introduction of the adhesive layer on the carrier foil into the mold, and
pulling the carrier foil off the adhesive layer, the adhesive layer hereby remaining at least for the most part in the mold.

3. The method according to claim 1, further comprising locating the adhesive layer on the first segment and introducing the adhesive layer on the first segment into the mold.

4. The method according to claim 3, wherein the adhesive layer is covered by a protective foil prior to introduction of the adhesive layer on the first segment into the mold.

5. The method according to claim 1, wherein the adhesive layer covers only part of the area of the first segment.

6. The method according to claim 1, wherein, after the first segment has been lifted off, a cleaning compound is injected into the mold, wherein the adhesive layer builds an adhesive force to the cleaning compound that is higher than the adhesive force between the adhesive layer and the mold.

* * * * *